US008556060B2

(12) United States Patent
Sejourne

(10) Patent No.: US 8,556,060 B2
(45) Date of Patent: Oct. 15, 2013

(54) ROLLER CONVEYOR MODULE

(75) Inventor: Jerome Sejourne, Saint-Diery (FR)

(73) Assignee: Interroll Holding AG, Sant'Antonino (CH)

( * ) Notice: Subject to any disclaimer, the term of this patent is extended or adjusted under 35 U.S.C. 154(b) by 0 days.

(21) Appl. No.: 13/430,437

(22) Filed: Mar. 26, 2012

(65) Prior Publication Data

US 2012/0247916 A1    Oct. 4, 2012

(30) Foreign Application Priority Data

Mar. 30, 2011  (EP) ..................................... 11160468

(51) Int. Cl.
*B65G 13/075*   (2006.01)

(52) U.S. Cl.
USPC .......................................... 193/35 A; 198/530

(58) Field of Classification Search
USPC ........... 193/35 A; 198/345.3, 459.6, 530, 531
See application file for complete search history.

(56) References Cited

U.S. PATENT DOCUMENTS

| 4,000,796 | A | * | 1/1977 | Bolton et al. ................ 193/35 A |
| 4,182,440 | A | * | 1/1980 | Juergens ..................... 193/35 A |
| 6,220,418 | B1 | * | 4/2001 | Moradians .................. 193/35 A |
| 6,230,908 | B1 | * | 5/2001 | Sloan et al. .................... 211/151 |
| 6,763,930 | B2 | * | 7/2004 | Johnson et al. ............. 198/459.6 |
| 7,380,649 | B2 | * | 6/2008 | Lauyans ..................... 198/345.3 |
| 7,484,615 | B2 | * | 2/2009 | Miyamoto .................. 198/345.1 |
| 7,559,419 | B2 | * | 7/2009 | Unterhuber ................ 198/345.3 |
| 8,256,602 | B2 | * | 9/2012 | Huber et al. ................. 193/35 R |
| 2002/0066635 | A1 | * | 6/2002 | McTaggart et al. ......... 193/35 A |
| 2007/0170035 | A1 | * | 7/2007 | Robinson .................... 193/35 A |
| 2007/0267271 | A1 | * | 11/2007 | Brown ............................ 193/37 |
| 2009/0159393 | A1 | * | 6/2009 | Lindemann et al. ........ 193/35 A |

FOREIGN PATENT DOCUMENTS

EP          1213242 A1    12/2002

* cited by examiner

*Primary Examiner* — Gene Crawford
*Assistant Examiner* — Keith R Campbell
(74) *Attorney, Agent, or Firm* — Kilpatrick Townsend & Stockton LLP

(57) ABSTRACT

The invention relates to a roller conveyor module, comprising at least one rack, a plurality of rollers mounted to said rack in a serial arrangement, and the upper circumferential surface parts of the plurality of rollers define a load carrying plane. According to the invention, a lever mounted to said rack is provided, wherein the lever is adapted to swivel between an unbalanced position and arranged at least partially above said load carrying plane and wherein the lever is free to swivel in two opposite directions, a passing position, wherein the lever is arranged below the load carrying plane to allow an item moving on the rollers to pass in the first direction, and a stopping position, wherein a stopping portion of said lever is arranged above said load carrying plane to hinder an item moving on the rollers in a second direction opposite to the first direction.

11 Claims, 3 Drawing Sheets

ROLLER CONVEYOR MODULE

CROSS-REFERENCE TO RELATED APPLICATION

Figure 1:
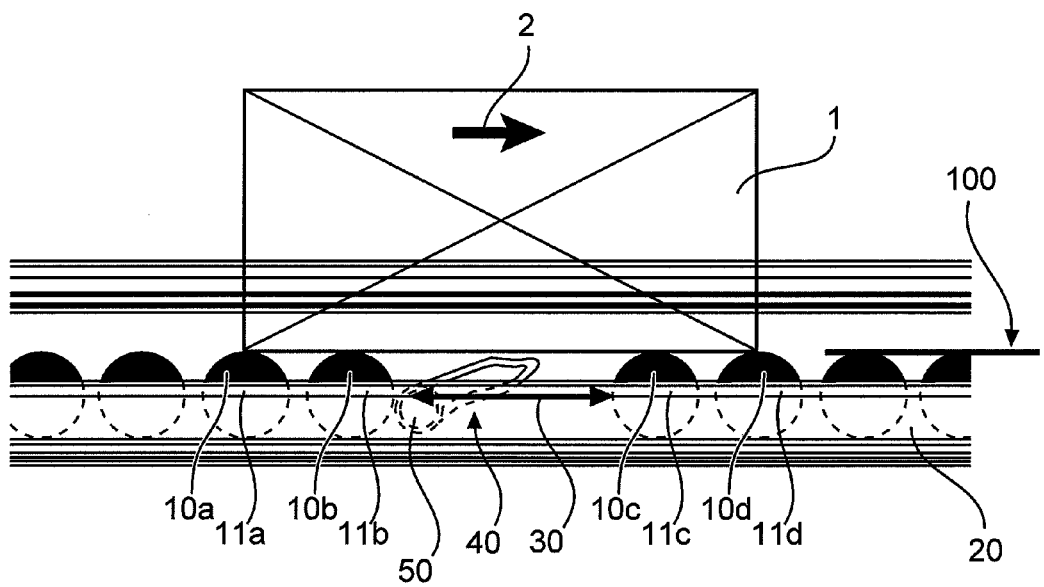

This application claims the benefit of priority of European Application No. 11 160 468.2-1261, filed Mar. 30, 2011, the disclosure of which is herein incorporated by reference.

The invention relates to a roller conveyor module, comprising at least one rack, a plurality of rollers mounted to said rack in a serial arrangement, wherein the rotating axis of each roller is approximately perpendicular to the longitudinal axis of the rack, and the upper circumferential surface parts of the plurality of rollers define a load carrying plane.

Roller conveyor modules of this kind are used in various appliances for conveying different items like boxes, containers or alike. A particular use of such roller conveyor modules is a gravity driven module, wherein the plurality of rollers define an upper load carrying surface which is somewhat inclined versus the horizontal plane to allow items to roll downwards on such module driven by gravity. Such gravity driven modules are for example used as gravity feed rack for order picking. Often, it is required to allow items to move on such conveyor roller module to move in one direction but to stop these items from moving in another direction opposite to said one direction. Further, it is in particular in a picking station, required to fix an item on such conveyor roller module to allow defined picking of said item from said roller module.

EP 1 213 242 A1 discloses a mechanism for defined stoppage of an item moving along a roller conveyor surface. Said mechanism comprises a lever pivotable around an axis lying in line and parallel the axis of rotation of the rollers. The lever is biased via a spring and has an upper rounded surface for contacting the bottom surface of the item. While this device is capable of stopping an item rolling on the module in one direction and letting said item pass when rolling in another direction there is a need for a roller conveyor module allowing to keep an item in a resting position while at the same time preventing such an item from being damaged by the stopping or the fixing action. Further, there is a need for a conveyor module which is adapted to securely hinder an item from moving in one direction without imparting high loads on any part of the roller conveyor module or the item in the course of a stopping action of an item moving along said direction with high speed and having a high weight.

According to the invention, this need is satisfied by a roller conveyor module as explained before hand, comprising a lever mounted to said rack, wherein the lever is adapted to swivel between an unbalanced position, wherein said lever is arranged at least partially above said load carrying plane and wherein the lever is free to swivel in two opposite directions, a passing position, wherein the lever is arranged below the load carrying plane to allow an item moving on the rollers to pass in the first direction, and a stopping position, wherein a stopping portion of said lever is arranged above said load carrying plane to hinder an item moving on the rollers in a second direction opposite to the first direction.

According to the invention a lever is provided which is mounted to said rack. Said lever may preferably be arranged between two subsequent rollers of the module. Said lever is mounted to said rack in such a way that it can swivel between an unbalanced position, a passing position and a stopping position. The swivel action of the lever may be a rotating movement about a defined axis but a translational movement of the lever may be superimposed to said rotating movement. In the passing position the lever is arranged below the load carrying plane which is defined by the upper circumferential of the rollers. In this passing position an item is not hindered to pass the lever and can thus move in the first direction.

In the stopping position the lever hinders an item rolling on said load carrying surface to move in a second direction which is opposite to the first direction. This hindering is achieved by a stopping portion of the lever which extends above the load carrying plane. The lever swivels from the passing position into the stopping position and if an item is moving in a second direction, the lever is hold in the stopping position to maintain the blockage of the item.

Further an unbalanced position of the lever is present. The unbalanced position of the lever may be a position between the passing position and the stopping position. Alternatively, the unbalanced position may be a position close to or identical with the stopping position. In the latter case, an item moving in the first direction will inadvertently contact the lever since the stopping portion of the lever extends above the load carrying surface. The lever is then swivelled by the item to the passing position by the movement by the item and allows passing of the item in the first direction.

With the roller conveyor module according to the invention an effective element for a picking up of different items from a conveyor is provided wherein the item is carefully hold in a position which allows simple picking-up of the item.

According to a first preferred embodiment said lever is hold in said unbalanced position by a spring or a counterweight. By this, the function of the lever may be used in subsequent handling of a plurality of items on the roller conveyor module. It is to be understood that counterweight may in particular be formed as an integral part of the lever.

Still further, it is preferred that in said stopping position said lever contacts a roller. According to this embodiment, the lever, in particular the stopping portion of the lever contacts a roller, preferably a roller which is adjacent to said lever. By this, a defined position of the lever in the stopping position is achieved and at the same time the roller is hindered from rotation by a fractional interaction between the lever and the roller. Further, any rollers which may be coupled to said roller which is in contact with the lever are hindered from rotating and thus a movement of an item on the roller conveyor module is prevented by additional means.

In particular, it is preferred to further improve the roller conveyor module by a brake surface at the lever, said brake surface contacting said roller in said stopping position and having a concave shape with a radius corresponding to the radius of said roller. Such brake surface at the lever which may in particular be arranged partially at the stopping portion of the lever allows for a contact between the lever and the roller which prevents any damage or wear of the roller or lever even in long-term-use of the module according to the invention. The concave brake surface may be provided to extent over a circumferential section of more than 10 degree of the circumferential surface of the roller, in particular over a circumferential section below 90 degree to allow for a close and effective contact between the lever and the roller.

Still further, it is preferred that in said stopping position an inclined sliding face at the stopping portion is arranged above said load carrying plane, said sliding face being inclined against said load carrying plane to lift an item rolling on the rollers in the second direction from the rollers when the item slides along said inclined sliding face. According to this embodiment, the stopping portion of the stopping lever is designed in such a way that it includes an inclined sliding face wherein at least a part of said inclined sliding face extends above the load carrying plane. Said inclined sliding face may be arranged in an angle of approximately 45 or less degree against the load carrying plane and thus allow an item to slide upwards on said inclined sliding face when it is moved against said stopping portion of the lever.

Still further, it is preferred that in said stopping position an upper sliding face at the stopping portion is arranged above said load carrying plane, said upper sliding face being approximately parallel to said load carrying plane to hold an item rolling on the rollers in the second direction above the rollers when the item slides along said upper sliding face. According to this embodiment, an upper sliding face is provided at the stopping portion of the lever, said upper sliding face being arranged above the load carrying plane when the stopping lever is arranged in the stopping position. This upper sliding face serves to decelerate an item by a frictional interaction with the bottom surface of the item and in course of this holds the item above the load carrying plane. Thus, a portion of the weight force of the item is acting on said upper sliding face in using a frictional force between said upper sliding face and the bottom surface of the item. This part of the weight force of the item increases when the item is moving further and the centre of gravity of the item approaches to a position straight above the upper sliding face. By this, an increase of the frictional force is induced resulting in an increased braking force acting onto the item. Thus, it is possible to securely stop and hold an item using the stopping lever and the roller conveyer module according to the invention independently from the total weight of the item and mostly independent from the frictional properties of the bottom surface of the item.

In particular, it is preferred to provide an inclined sliding face and an upper sliding face as explained beforehand and to arrange these two faces in such a way that in said stopping position said upper sliding face is arranged behind said inclined sliding face in the second direction. By this, a smooth transition of an item rolling on a roller conveyor module into picking position on the stopping portion of the lever is achieved.

Preferably, the lever is pivoted around an axis arranged below the load carrying plane. This allows for a simple and enduring pivoting action of the lever. According to a further preferred embodiment the lever is pivoted around an axis extending in a direction approximately parallel to said axis of rotation of the rollers adjacent to said lever. By this the pivoting action of the lever is conducted in an easy and reliable manner by the forces acting onto the lever as imparted by an item moving along the roller conveyor module.

Still further it is preferred that the roller module is a gravity lane module, the first direction extending in a direction, wherein items are rolling downwards and the second direction extending in a direction, wherein items are rolling upwards. This embodiment is particularly preferred for commissioning or picking stations in a gravity lane of a gravity feed rack and allows for quick and easy handling of items on such gravity lane. In particular, this embodiment allows the items to pass the lever along said lane in a downwards direction to a position where the items can be registered and allows to safely stop and hold the items in a picking position if they are moved or pushed in the upwards direction along the gravity lane. By this, a user of the gravity lane can handle, register and pick up items from the gravity lane as high rates with short time intervals between two subsequent items to be registered and picked from the lane.

A further aspect of the invention is a method of conveying items along a plurality of rollers, wherein the items roll on a load carrying plane defined by the rollers in a first direction and are stopped in a second direction opposite to said first direction, wherein a lever is adapted to swivel between a passing position and a stopping position, said lever being arranged below the load carrying plane in a passing position to allow an item to move in the first direction and to pass said lever, a stopping portion of said lever is arranged above the load carrying plane in a stopping position to brake an item moving in the second direction.

Using this method, items rolling on a roller conveyor module, in particular a gravity feed rack for order picking can be stopped and hold securely in a picking position after having passed this picking position and being moved back along the rack. With regard to functionalities and advantages of this method it is referred to the corresponding characteristics and explanations of the above explained roller conveyor module.

The method may be further improved in that in the stopping portion of said lever an item is lifted above the load carrying plane by an inclined sliding face at the stopping portion of said lever and is hold above said load carrying plane by an upper sliding face adjacent to said inclined sliding face when sliding over said lever. Further, it is preferred that said lever swivels around an axis which is arranged parallel to the axis of rotation of the rollers adjacent to said lever.

Figure 2:
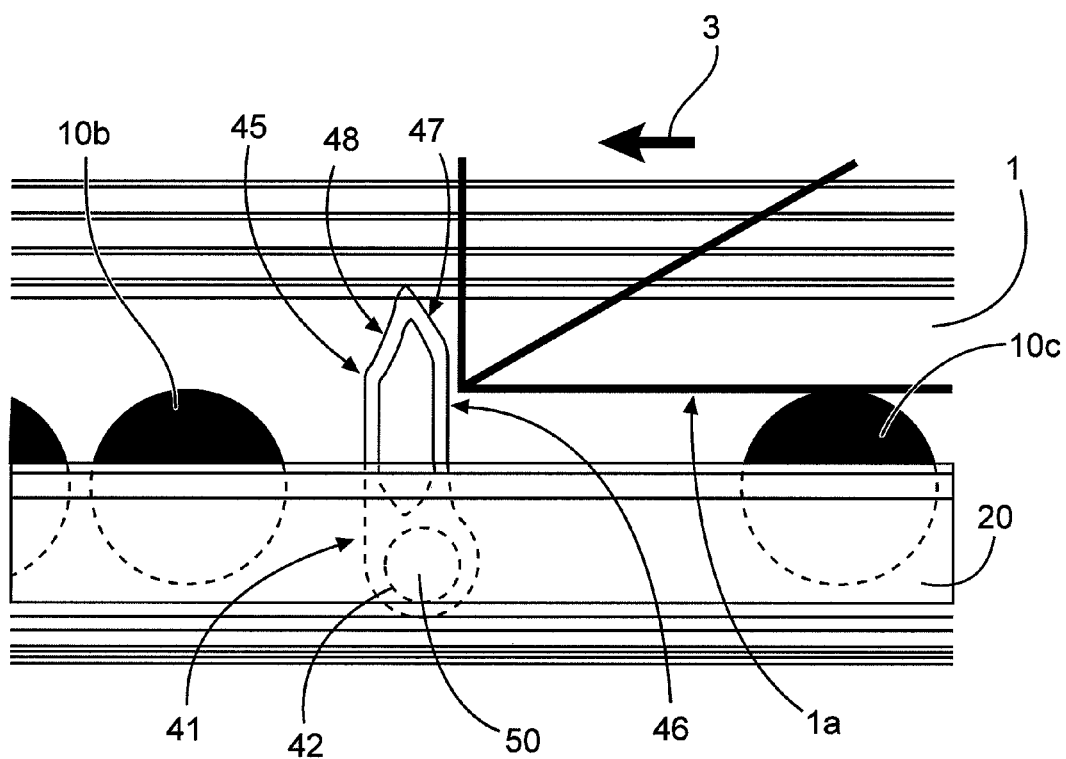
Figure 3:
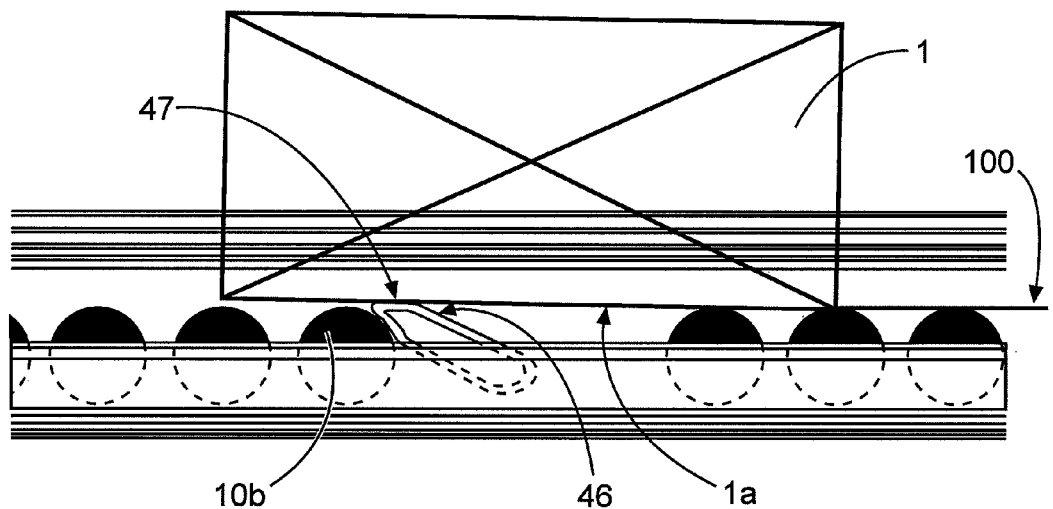

A preferred embodiment of the invention is explained referring to the figures. In the figures a sequence of a reciprocal movement and holding of a box on a roller conveyor module according to the invention is shown. In detail FIG. 1 shows a downward movement of a box passing a stopping lever, FIG. 2 shows an upward movement of said box swiveling the lever from an unbalanced position into the stopping position, and FIG. 3 shows a stopped position of the box resting on the lever.

As can be seen in the figures, a roller conveyor module according to the invention comprises a plurality of rollers 10a-d. The upper circumferential surface of these rollers define a load carrying plane 100. The rollers are fixed in two racks extending on the axial sides of these rollers and are mounted to said racks to rotate along an axis 11a-d thus defining a wheel track. The axis 11 a-d are lying in a parallel plane to the load carrying plane.

A box 1 may be positioned on the load carrying plane 100 and will then move downwards on this plane by a rolling movement on the rollers 10a-d. This is shown in FIG. 1. The box 1 may further be pushed in the upwards direction 3, as shown in FIG. 2 by arrow 3 and then move on the load carrying plane in such upwards direction 3.

Generally, the rollers 10a,b and 10c,d are arranged adjacent to each other and the distance between the axis of two adjacent rollers is somewhat larger than the diameter of the rollers resulting in a distance between two adjacent rollers leaving a gap of less than the diameter of the rollers between the circumferential surface of said rollers.

A larger gap 30 exists between the two adjacent rollers 10b and 10c. In this gap 30, a stopping lever 40 is mounted to said racks 20.

The stopping lever 40 comprises a stopping portion 45 and a bearing portion 41. The bearing portion 41 is always arranged below the load carrying plane and comprises an opening 42. The stopping lever 40 is rotatable about an axis 50 extending through said opening 42.

The stopping portion 45 of the stopping lever may be arranged below the load carrying plane 100 or may be arranged partially above said load carrying plane depending on the pivoting position of the stopping lever around the axis 50.

At the stopping portion 45, an inclined sliding face 46 and an upper sliding face 47 is provided. Further, a concave face 48 is provided opposite to the upper sliding face at the tip of the stopping lever. As shown in FIG. 1, the stopping lever is arranged in a passing position wherein the whole stopping portion 45 of the lever is arranged below the load carrying plane 100.

FIG. 2 shows an unbalanced position wherein the stopping portion partially extends above the load carrying plane. As can be seen, a box 1 moving on the load carrying plane in an upward direction 3 will contact the inclined sliding face 46 of the lever and rotate the lever to a position wherein the concave face 48 of the lever will contact the roller 10*b*.

As can be seen in FIG. 3, the box 1 will slide on the inclined sliding face of the lever after the lever has been rotated into a stopping position shown in FIG. 3. By this, the bottom face 1*a* of the box 1 will come into contact with the upper sliding face 47 of the lever. A frictional force will occur between this upper sliding face 47 of the lever and the bottom surface a of the box 1. This frictional force will increase depending on the position of the centre of gravity of the box 1. Assuming that the centre of gravity of the box 1 is in the middle of the box, the frictional force will increase the more the box slides onto the lever until a position wherein the centre of gravity is arranged exactly above the upper sliding face of the lever. In regular use, at this point the box 1 will be stopped at the latest by an increasing frictional force and will rest upon the lever without moving further.

In this position the box 1 may be picked from the roller conveyor module easily as it is in a defined and fixed position.

After the box 1 has been picked from the roller conveyor module, the lever 40 will return to its position as shown in FIG. 2 and will thus either allow an item to pass as shown in FIG. 1 or stop an item from moving upwards along the roller conveyor module as shown in FIGS. 2 and 3 again.

The invention claimed is:

1. A roller conveyor module, comprising:
   at least one rack;
   a plurality of rollers mounted to said rack in a serial arrangement, wherein
      the rotating axis of each roller is approximately perpendicular to the longitudinal axis of the rack, and
      the upper circumferential surface parts of the plurality of rollers define a load carrying plane,
   characterized by
   a lever mounted to said rack, wherein the lever is adapted to swivel between
      an unbalanced position, wherein said lever is arranged at least partially above said load carrying plane and is free to swivel in two opposite directions,
      a passing position, wherein the lever is arranged below the load carrying plane to allow an item moving on the rollers to pass in a first direction, and
      a stopping position, wherein a stopping portion of said lever is arranged above said load carrying plane to hinder an item moving on the rollers in a second direction opposite to the first direction, and
   further characterized in that in said stopping position said lever contacts a roller.

2. The roller conveyor module according to claim 1, characterized in that said lever is held in said unbalanced position by a spring or a counterweight.

3. The roller conveyor module according to claim 1, characterized by a brake surface at the lever, said brake surface contacting said roller in said stopping position and having a concave shape with a radius corresponding to the radius of said roller.

4. A roller conveyor module, comprising:
   at least one rack;
   a plurality of rollers mounted to said rack in a serial arrangement, wherein
      the rotating axis of each roller is approximately perpendicular to the longitudinal axis of the rack, and
      the upper circumferential surface parts of the plurality of rollers define a load carrying plane,
   characterized by
   a lever mounted to said rack, wherein the lever is adapted to swivel between
      an unbalanced position, wherein said lever is arranged at least partially above said load carrying plane and is free to swivel in two opposite directions,
      a passing position, wherein the lever is arranged below the load carrying plane to allow an item moving on the rollers to pass in a first direction, and
      a stopping position, wherein a stopping portion of said lever is arranged above said load carrying plane to hinder an item moving on the rollers in a second direction opposite to the first direction, and further
   characterized in that in said stopping position an inclined sliding face at the stopping portion is arranged above said load carrying plane, said sliding face being inclined against said load carrying plane to lift an item rolling on the rollers in the second direction from the rollers when the item slides along said inclined sliding face.

5. The roller conveyor module according to claim 4, characterized in that in said stopping position an upper sliding face at the stopping portion is arranged above said load carrying plane, said sliding face being approximately parallel to said load carrying plane to hold an item rolling on the rollers in the second direction above the rollers when the item slides along said upper sliding face.

6. The roller conveyor module according to claim 4, characterized in that in said stopping position said upper sliding face is arranged behind said inclined sliding face in the second direction.

7. The roller conveyor module according to claim 1, characterized in that the lever is pivoted around an axis arranged below the load carrying plane.

8. The roller conveyor module according to claim 1, characterized in that the lever is pivoted around an axis extending in a direction approximately parallel to said axis of rotation of the rollers adjacent to said lever.

9. The roller conveyor module according to claim 1, characterized in that the roller module is a gravity lane module, the first direction extending in a direction, wherein items are rolling downwards and the second direction extending in a direction, wherein items are rolling upwards.

10. A method of conveying items along a plurality of rollers, wherein the items roll on a load carrying plane defined by the rollers in a first direction and are stopped in a second direction opposite to said first direction,
   characterized in that
   a lever is adapted to swivel between a passing position and a stopping position,
   said lever being arranged below the load carrying plane in a passing position to allow an item to move in the first direction and to pass said lever,
   a stopping portion of said lever is arranged above the load carrying plane in a stopping position to brake an item moving in the second direction, further characterized in that
   the stopping portion of said lever an item is lifted above the load carrying plane by an inclined sliding face at the stopping portion of said lever and is held above said load carrying plane by an upper sliding face adjacent to said inclined sliding face when sliding over said lever.

11. The method of claim 10,
characterized in that said lever swivels around an axis which is arranged parallel to the axis of rotation of the rollers adjacent to said lever.

* * * * *